(12) United States Patent
Urbon (10) Patent No.: US 7,157,729 B2
(45) Date of Patent: Jan. 2, 2007

(54) STORAGE PHOSPHOR MEDIA SERVICE AND JAM ACCESS IN A CR READER

(75) Inventor: Michael P. Urbon, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/767,570

(22) Filed: Jan. 29, 2004

(65) Prior Publication Data

US 2004/0238768 A1 Dec. 2, 2004

Related U.S. Application Data

(60) Provisional application No. 60/444,044, filed on Jan. 31, 2003.

(51) Int. Cl.
G03B 42/08 (2006.01)

(52) U.S. Cl. ...................................... 250/589; 250/588

(58) Field of Classification Search ................ 250/580, 250/581, 582, 583, 584, 585, 587, 589, 484.4, 250/485.1
See application file for complete search history.

(56) References Cited

U.S. PATENT DOCUMENTS

| | | | | |
|---|---|---|---|---|
| RE31,847 E | | 3/1985 | Luckey | |
| 4,659,929 A | * | 4/1987 | Fujiwara et al. | 250/589 |
| 4,861,995 A | * | 8/1989 | Ohgoda | 250/589 |
| 5,025,156 A | * | 6/1991 | Ohgoda | 250/590 |
| 5,311,032 A | * | 5/1994 | Montoro et al. | 250/584 |
| 5,376,806 A | * | 12/1994 | Hejazi | 250/584 |
| 5,592,374 A | * | 1/1997 | Fellegara et al. | 705/3 |
| 5,678,303 A | * | 10/1997 | Wichmann | 29/806 |
| 5,773,839 A | * | 6/1998 | Krepel et al. | 250/580 |
| 6,355,938 B1 | * | 3/2002 | Cantu et al. | 250/584 |
| D492,414 S | * | 6/2004 | Perry et al. | D24/158 |
| 6,773,160 B1 | * | 8/2004 | Evans et al. | 378/173 |
| 7,087,918 B1 | * | 8/2006 | Hall | 250/588 |
| 2004/0238767 A1 | * | 12/2004 | Steklenski et al. | 250/588 |
| 2005/0040353 A1 | * | 2/2005 | Alzner et al. | 250/584 |

\* cited by examiner

*Primary Examiner*—David Porta
*Assistant Examiner*—Faye Boosalis
(74) *Attorney, Agent, or Firm*—Susan L. Parulski (57) ABSTRACT

A storage phosphor reader. The reader comprises a receiving station adapted to receive a cassette containing a removable storage phosphor. The reader further comprises a path along which the storage phosphor is transportable in a first and second direction when removed from and returned to the cassette. The receiving station is disposed at one end of the path and an access area is disposed at the other end of the path. The access area can be exposed to light as the storage phosphor is transported along the path.

3 Claims, 7 Drawing Sheets

STORAGE PHOSPHOR MEDIA SERVICE AND JAM ACCESS IN A CR READER

CROSS REFERENCE TO RELATED APPLICATIONS

This is a 111A application of Provisional Application Ser. No., 60/444,044, filed Jan. 31, 2003.

FIELD OF THE INVENTION

The invention is directed to a storage phosphor imaging system.

BACKGROUND OF THE INVENTION

Storage phosphor imaging systems are known. In one such system, a storage phosphor is exposed to an x-ray image of an object, such as a body part of a patient, to record a latent x-ray image in the storage phosphor. The latent x-ray image is read out by stimulating the storage phosphor with stimulating radiation. Upon stimulation, the storage phosphor releases emitted radiation of a particular wavelength. To produce a signal useful in electronic image processing, the storage phosphor is scanned, for example, by a laser beam deflected by an oscillating or rotating scanning mirror or by a rotation hologon. The emitted radiation from the storage phosphor is reflected by a collector and detected by a photodetector, such as a photomultiplier, to produce an electronic x-ray image signal. The x-ray image signal can then be viewed as a visual image produced by a softcopy display device, such as a CRT or LCD display, or a hardcopy display device, such as a x-ray film printer (laser printer, CRT printer, thermal printer).

U.S. Pat. No. Re. 31,847 (Luckey) discloses a storage phosphor system.

The storage phosphor can be disposed on a medium, such as a sheet. When the storage phosphor is being processed/scanned/read/exposed by the storage phosphor processor/reader, there may be a desire to access the storage phosphor medium. For example, if the medium becomes lodged/jammed within the reader.

The present invention provides an apparatus for accessing the storage phosphor medium disposed within the CR reader.

SUMMARY OF THE INVENTION

According to the present invention, there is provided a CR reader having means to access a storage phosphor medium disposed within a CR reader.

This object is given only by way of illustrative example, and such object may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a storage phosphor reader. The reader comprises a receiving station adapted to receive a cassette containing a removable storage phosphor. The reader further comprises a path along which the storage phosphor is transportable in a first and second direction when removed from and returned to the cassette. The receiving station is disposed at one end of the path and an access area is disposed at the other end of the path. The access area can be exposed to light as the storage phosphor is transported along the path.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

The following is a detailed description of the preferred embodiments of the invention, reference being made to the drawings in which the same reference numerals identify the same elements of structure in each of the several figures.

Referring to FIGS. 1 through 6 there is shown a storage phosphor reader 10 in accordance with the present invention. Storage phosphor reader 10 processes images captured on storage phosphor using conventional radiographic equipments. Reader 10 then scans the storage phosphor and converts the latent x-ray image therein into an electrical x-ray image signal which can be viewed. Reader 10 can be operated using a touch screen, generally illustrated in FIG. 1 as display 12.

The storage phosphor used to hold the latent image can be erased and used repeatably. The storage phosphor can be disposed on a flexible or semi-flexible medium, such as a sheet, which can be mounted in an x-ray cassette. An example of such a cassette is disclosed in U.S. Ser. No. 08/087,990 (Kodak Docket No. 85921) provisionally filed on Feb. 3, 2003 as Provisional Application U.S. Ser. No. 60/444,462, commonly assigned and incorporated herein by reference. Such cassettes can be of varying sizes. The medium is often referred to as a sheet or screen.

Figure 1:
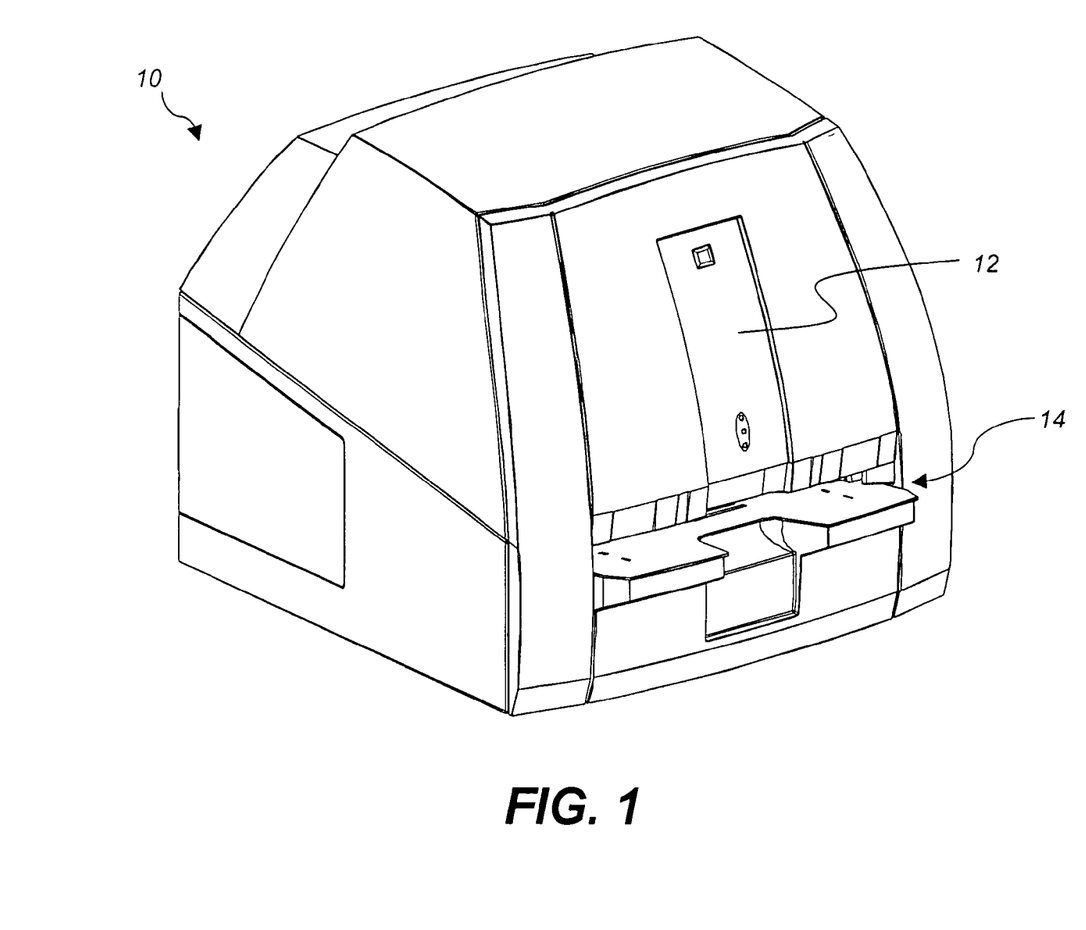
FIG. 1 shows a front perspective view of a storage phosphor reader in accordance with the present invention.
Figure 2:
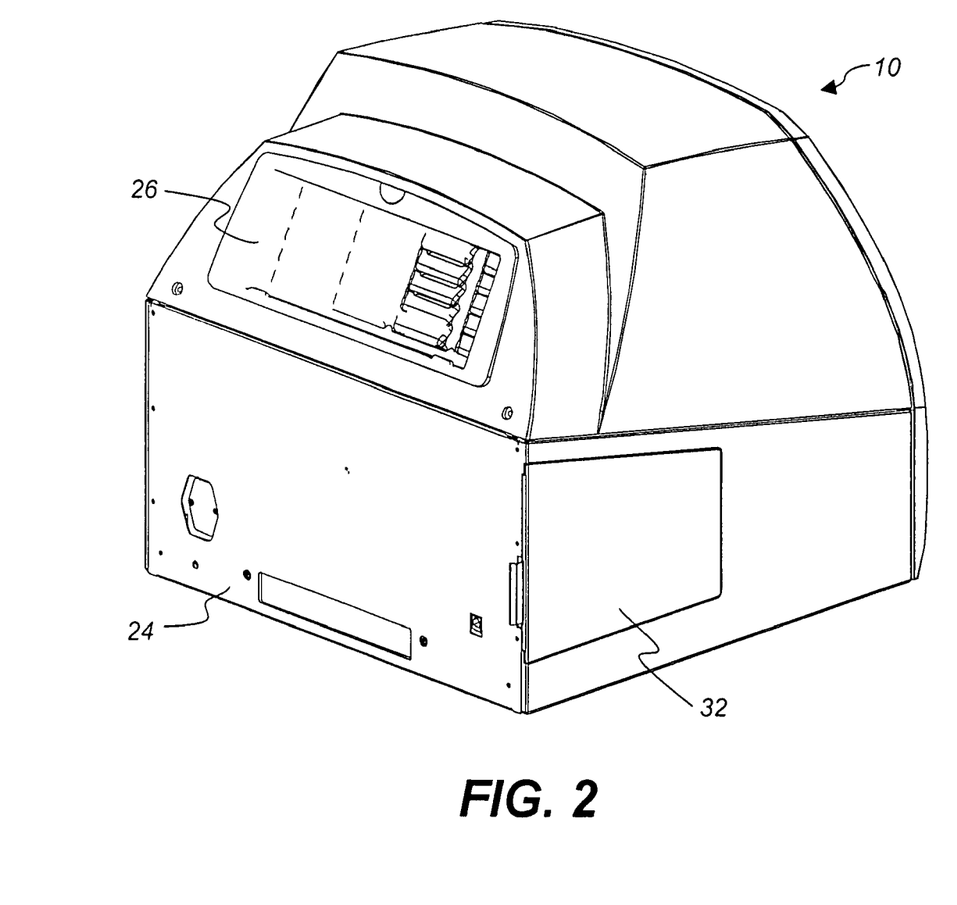
FIG. 2 shows a rear perspective view of a storage phosphor reader in accordance with the present invention.

Once the radiology technologist exposes a body part to an x-ray which is storage as a latent image on the screen, the cassette is loaded into reader 10 at a receiving station or supply area 14. Cassette supply area 14 is shown in FIG. 1 as a load platform. Scanning is then initiated, for example, by pressing a start button on touch screen 12.

Inside reader 10, using means known to those skilled in the art, the screen is extracted from the cassette and moved along a path P in a direction A through a scan area 16 wherein the screen is scanned. Once a portion of the screen has been scanned, it is erased by being moved through an erase area 18 wherein it is erased by exposure to light which removes the remnants of the image.

Once the entire screen has been scanned and erased, the direction of the screen is reversed and the screen is returned to the cassette.

It is recognized that the screen can be erased in the return direction (i.e., when being returned to the cassette) rather than the forward direction (i.e., direction A).

A light cover 20 can be provided to shield the scan area from exposure to ambient or room light. Light cover 20 can also be employed to shield other elements of reader 10, such as the scan element and collector from exposure to ambient or room light.

Figure 3:
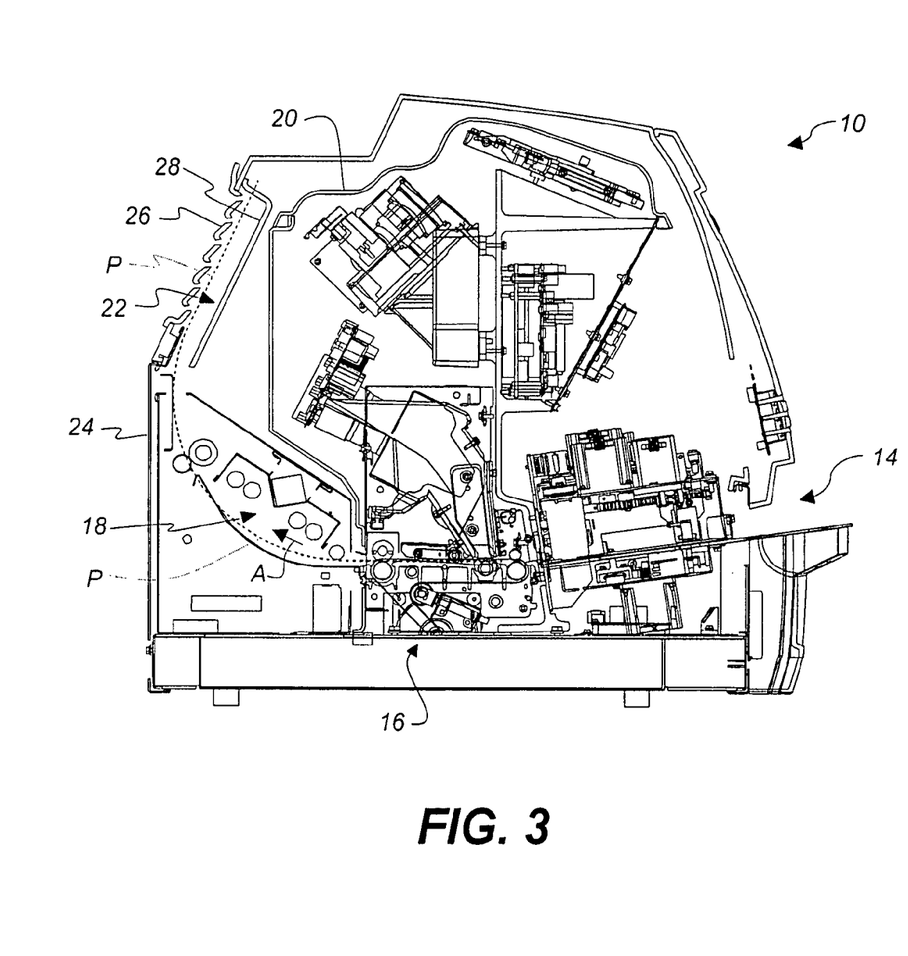
FIG. 3 shows a left side plan view of the storage phosphor reader of FIGS. 1 and 2.
Figure 4:
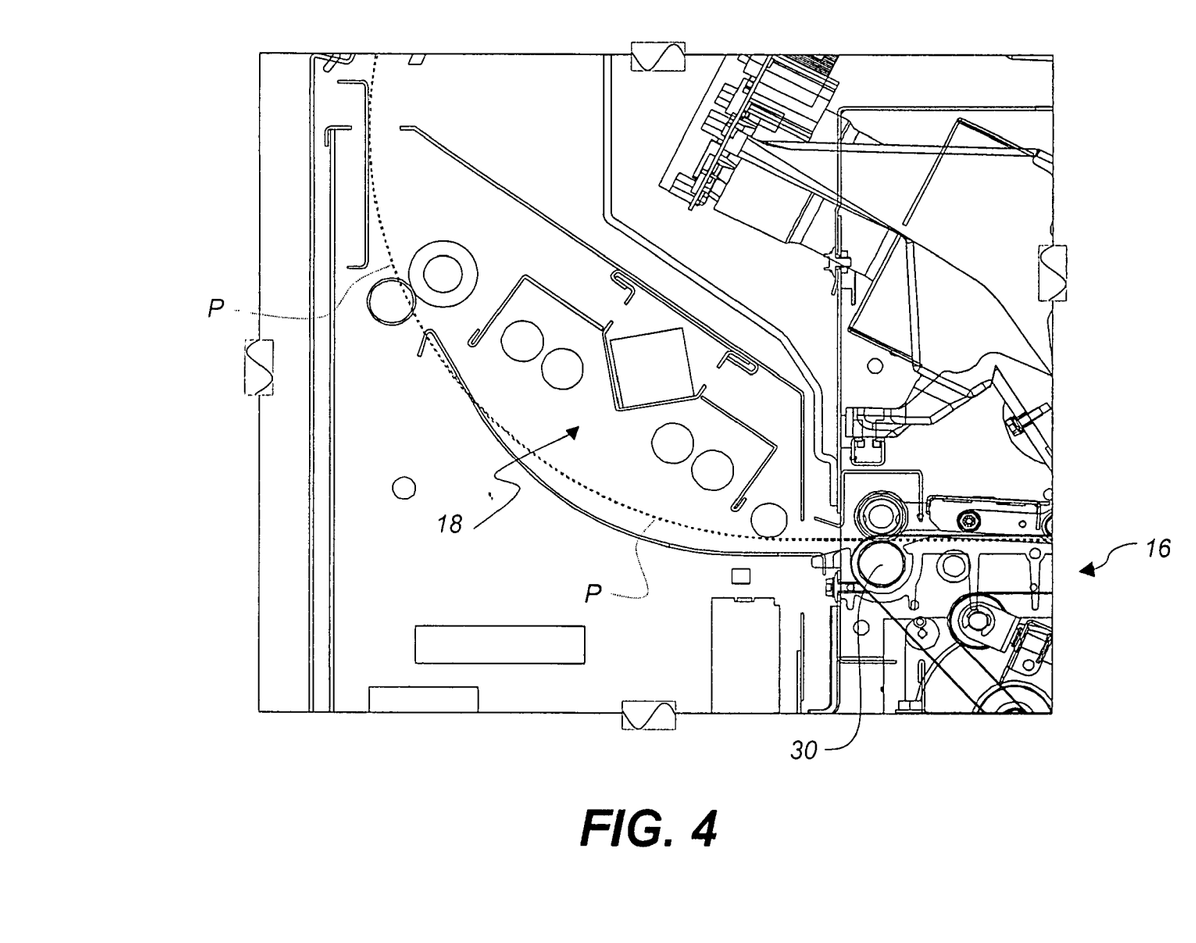
FIG. 4 shows the erase assembly of the storage phosphor reader of FIG. 3.
Figure 5:
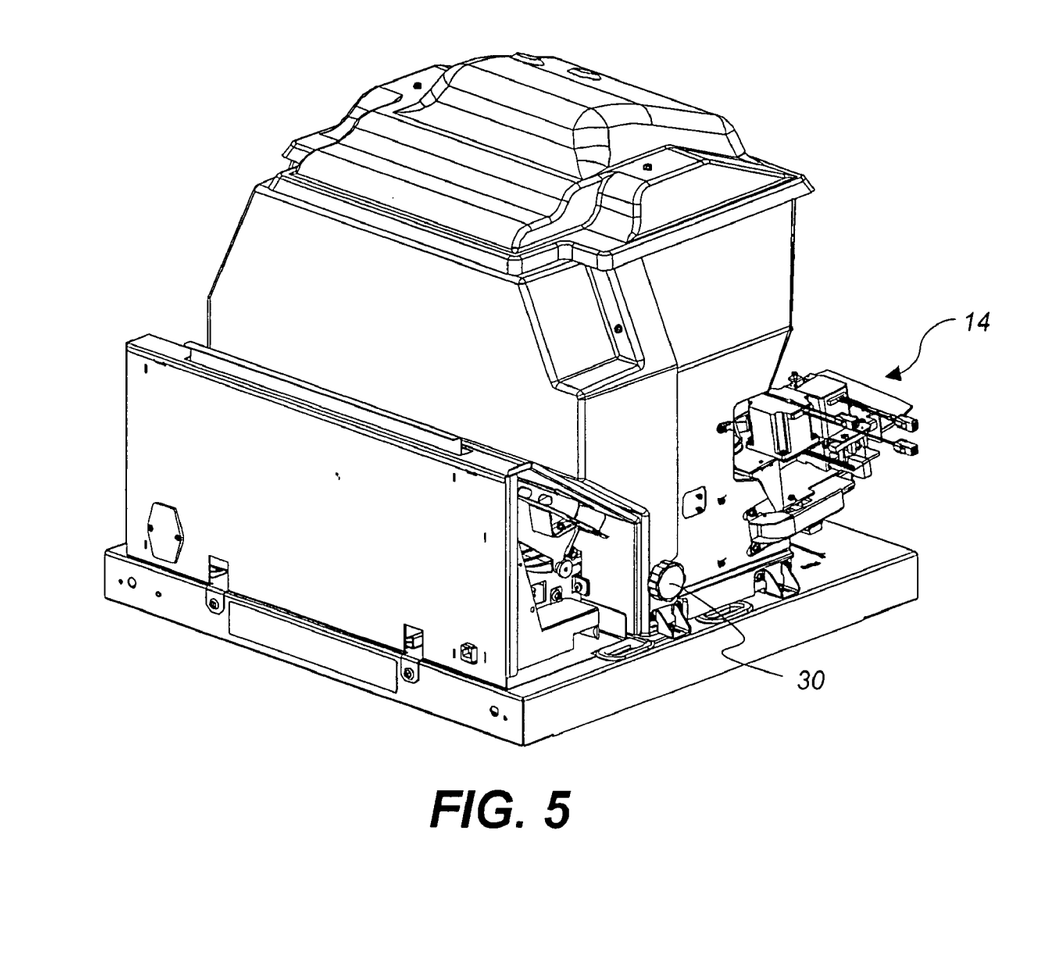
FIG. 5 shows a rear perspective view of portions of the storage phosphor reader of the present invention.
Figure 6:
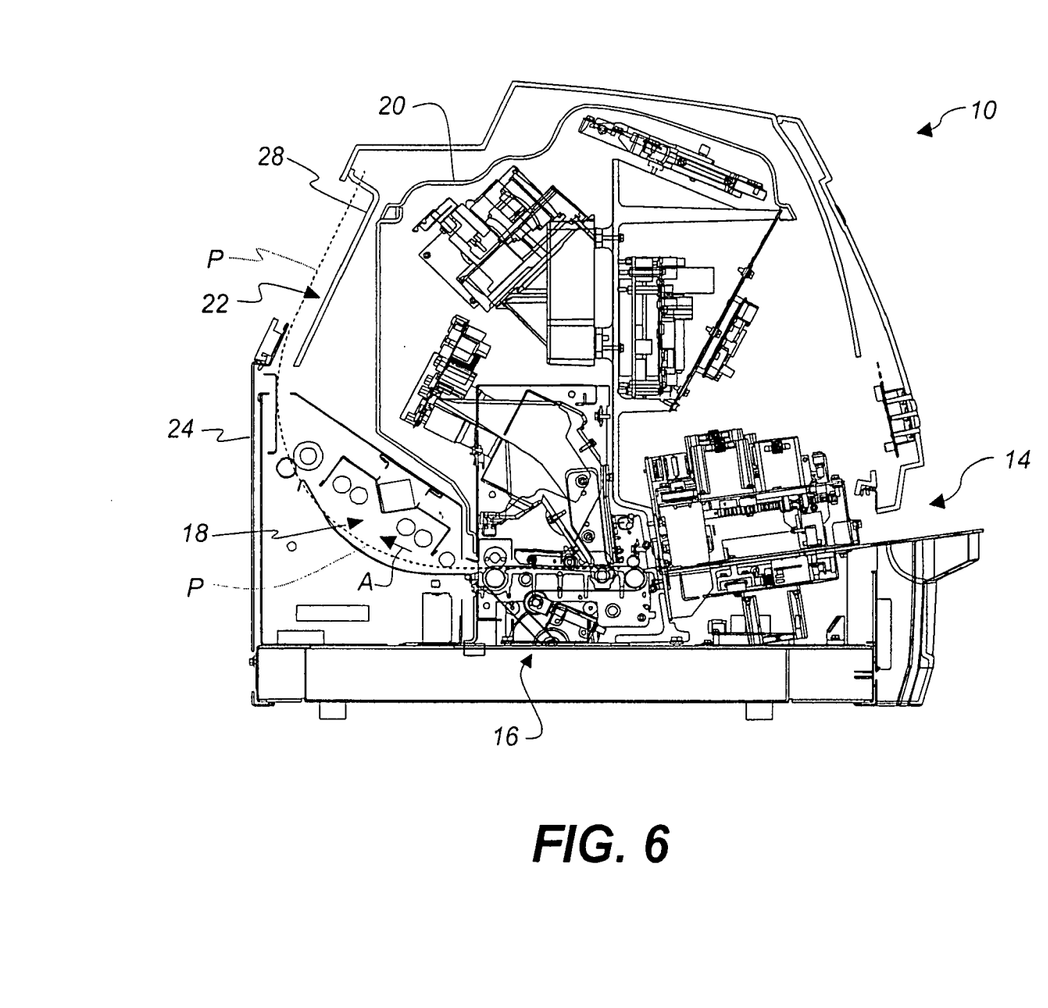
FIG. 6 shows the left side plan view of FIG. 3 with the cover removed to expose the access area.

As best shown in FIG. 3, portions of the screen may extend beyond erase area 18, particularly if the screen is of a larger size. Accordingly, a portion of the screen may be disposed within an area herein referred to as an access area 22. Access area 22 is an area disposed proximate path P outside of erase area 18 and which is not shielded by light cover 20. In FIG. 3, access area 22 is disposed proximate a rear side 24 of reader 10. If desired, a cover or other access member 26 can be configured to shield/cover access area 22. Cover 26 is configured to be removable from reader 10 or pivot/move relative to reader 10 so that the portion of the screen disposed within access area 22 can be accessed. The cover can provide protection from dirt and dust. Cover 26 can be vented, as shown in FIGS. 1 and 3 to assist in the dissipation of heat or for aesthetics.

For example, if the screen jams inside reader 10 or there is a transport issue before the screen can be returned to the cassette, an operator can open/remove cover 26 of reader 10 to either remove the screen from reader 10 or make some adjustments so that the screen can be returned to the cassette.

Since the screen has already been scanned prior to being transported along path to access area 22, no image information is lost from the screen. Further, since the components which are preferably not exposed to room light are shielded by light cover 20, none of the components are adversely affected by an operator accessing the screen through access area 22.

An optional support member 28 can be provided to provide some support for the screen as it is disposed within access area 22.

If the screen is not present in the access area due to size and/or position of transport failure, a hand-operated member 30 can be employed to move the screen (along path P in the direction of arrow A) to access area 22. Preferably, member 30 is accessible from the exterior of reader 10. In the figures shown, member 30 is located behind a service access door 32 located on a lower left rear corner of reader 10.

Figure 7:
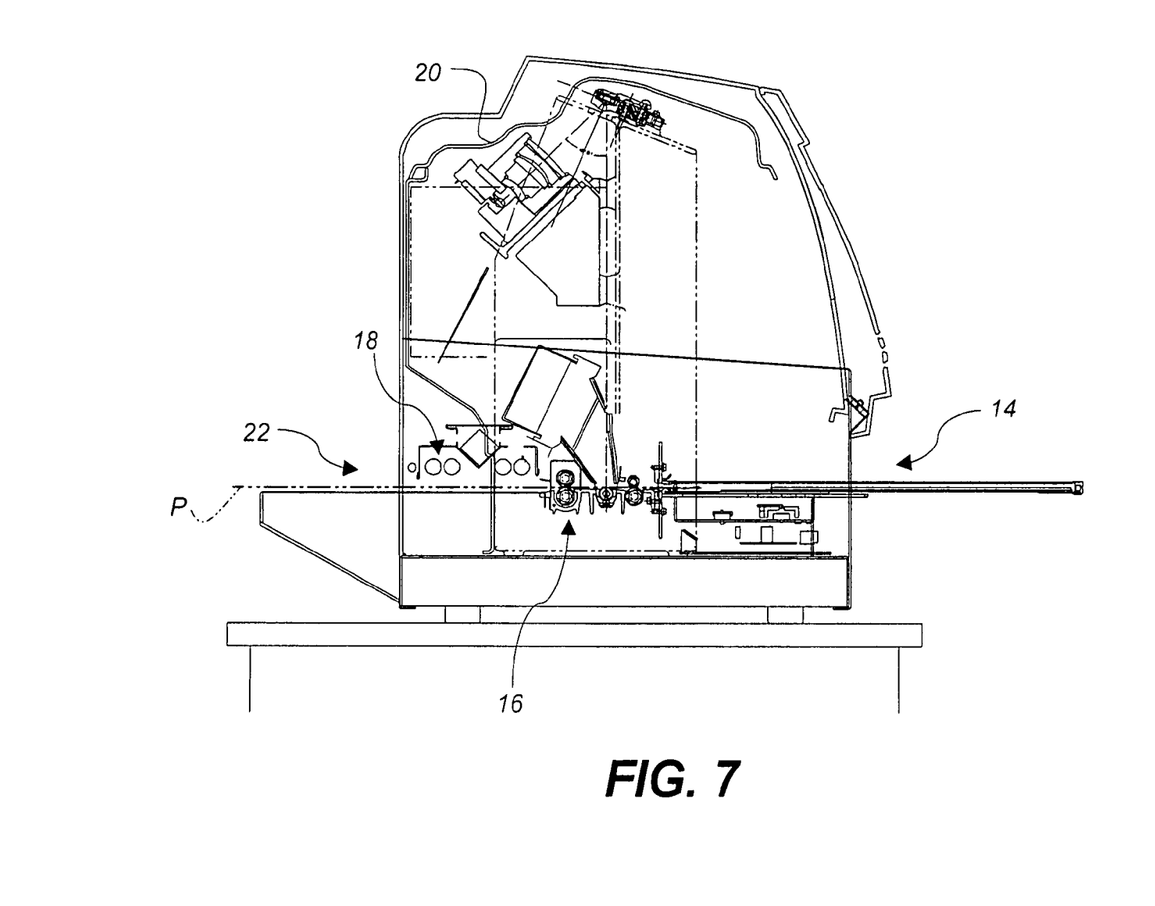
FIG. 7 shows a left side plan view of another embodiment of the storage phosphor reader of the present invention.

While the present invention has been described with regard to a flexible or semi-flexible storage phosphor medium, storage phosphor can disposed on a rigid or semi-rigid plate and mounted in a x-ray cassette. U.S. Pat. No. 5,943,390, commonly assigned and incorporated herein by reference, discloses such a cassette. Such plates and cassettes can be of varying sizes. A reader in accordance with the present invention can be configured to accept such a rigid or semi-rigid plate. Referring to FIG. 7, there is shown an embodiment wherein path P is substantially linear/planar.

Accordingly, the present invention relates to a CR reader wherein a flexible or rigid phosphor medium (also referred to as a screen) is transported from a cassette through a scanning reader and then to a buffer/access area wherein the screen direction is reversed to return the screen to the cassette. Throughput and speed requirement promote keeping mechanical subsystems small and closely populated. The screen utilize space exterior to the scanning elements of the reader as the access area. This access area can be employed since the light sensitive image has been read from the screen prior to reaching the external buffer zone. The screen travel has yet to be reversed through the erase section prior to returning the screen to the cassette. The screen can be exposed to normal room conditions while in the access area. Or, if desired, the access area can be covered to protect it from dirt and dust. The buffer area offers an opportunity for accessing the screen in the event of a transport problem.

In addition, reader 10 can include a reverse path feed option to allow reader 10 to be used as an erase-only device, for example, when not used as a reader.

While the present invention has been described with relation to a CR reader, the present invention can be applicable to other systems wherein access to a transportable medium/screen is desired and some elements of the system are light sensitive.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 storage phosphor reader
12 touch screen display
14 cassette supply area
16 scan area
18 erase area
20 light cover
22 access area
24 rear side
26 cover
28 optional support member
30 hand-operated member
32 service access door

What is claimed is:

1. A storage phosphor reader, comprising:
a receiving station adapted to receive a cassette containing a removable storage phosphor;
a path along which the storage phosphor is transportable in a first and second direction when removed from and returned to the cassette, the receiving station being disposed at one end of the path;
an access area disposed at the other end of the path wherein the access area can be exposed to ambient light as the storage phosphor is transported along the path; and
an erase area, spaced from the access area, disposed along the path intermediate the receiving station and the access area.

2. A storage phosphor reader, comprising:
a receiving station adapted to receive a cassette containing a removable storage phosphor;
a path along which the storage phosphor is transportable in a first and second direction when removed from and returned to the cassette, the receiving station being disposed at one end of the path;
an access area disposed at the other end of the path wherein the access area is exposed to an ambient environment in which the reader is disposed as the storage phosphor is transported along the path;
an erase area, separate from the access area, disposed along the path intermediate the receiving station and the access area; and
a removable cover disposed in the access area.

3. A storage phosphor reader, comprising:

a housing;

a receiving station disposed on one side of the housing adapted to receive a cassette containing a removable storage phosphor;

a path disposed within the housing along which the storage phosphor is transportable in a first and second direction when removed from and returned to the cassette, the receiving station being disposed at one end of the path;

an access area disposed on another side of the housing at the other end of the path wherein the access area can be exposed to an ambient environment as the storage phosphor is transported along the path;

an erase area, separate from the access area, disposed alone the path intermediate the receiving station and access area: and a detachable cover disposed in the access area.

* * * * *